United States Patent
Cummings et al.

(10) Patent No.: US 7,791,798 B2
(45) Date of Patent: Sep. 7, 2010

(54) LOW-PROFILE OPTICAL MOUNTING ASSEMBLY

(75) Inventors: Thomas Cummings, Jackson, MI (US); Byung Jin Chang, Ann Arbor, MI (US)

(73) Assignee: General Scientific Corporation, Ann Arbor, MI (US)

( * ) Notice: Subject to any disclaimer, the term of this patent is extended or adjusted under 35 U.S.C. 154(b) by 484 days.

(21) Appl. No.: 11/449,244

(22) Filed: Jun. 8, 2006

(65) Prior Publication Data
US 2007/0285772 A1   Dec. 13, 2007

(51) Int. Cl.
*G02B 23/00*   (2006.01)
(52) U.S. Cl. .................... 359/411; 359/412; 359/481
(58) Field of Classification Search .................. None
See application file for complete search history.

(56) References Cited

U.S. PATENT DOCUMENTS

| | | | |
|---|---|---|---|
| 4,704,000 A | 11/1987 | Pekar et al. | |
| 5,381,263 A | 1/1995 | Nowak et al. | |
| 6,333,814 B1 | 12/2001 | Chang et al. | |
| 6,439,714 B1 | 8/2002 | Cummings | |
| 6,704,141 B1 * | 3/2004 | Nowak et al. | 359/411 |

* cited by examiner

*Primary Examiner*—Arnel C Lavarias
(74) *Attorney, Agent, or Firm*—Gifford, Krass, Sprinkle, Anderson & Citkowski, P.C.

(57) ABSTRACT

In an ocular support assembly material present in the forward-looking cross-section of the outwardly extending support arms is removed, thereby reducing visual obscuration and enhancing peripheral vision. In the preferred embodiment, the top of each outwardly extending support arm is at or below the middle of the height of the housing, thereby resulting in a low-profile design. At the same time, the support arms are received by the housing with sliding engagement on all sides, thereby eliminating the need for ball bearings or spacers to counteract twisting. The result is a lightweight yet highly stable ocular mounting assembly.

4 Claims, 2 Drawing Sheets

LOW-PROFILE OPTICAL MOUNTING ASSEMBLY

FIELD OF THE INVENTION

This invention relates generally to ocular mounting assemblies of the type used in surgical, medical and dental applications and, in particular, to a stable, low-profile assembly affording enhanced peripheral vision.

BACKGROUND OF THE INVENTION

Telescopic instruments are widely used for magnifying a work area during precision work such as delicate surgery, dental work, inspection of circuit board solder joints, and assembly of miniature parts. A typical telemicroscopic instrument includes a pair of telemicroscopic loupes which are adjustably mounted to an eyeglass frame or headband. The telescopic loupes combine the long working distance of the telescope with the high quality magnification of the microscope. This type of optical instrument provides the user, a surgeon, for example, with a magnified image of the work area with a field of view at about an arm's length.

As one example, the ocular mounting assembly disclosed in U.S. Pat. No. 5,381,263 allows the mounting of a pair of ocular devices to an eyeglass frame, or head mount, and is linearly or rotationally adjustable through five degrees of freedom. An adjustable ocular support assembly with slidably extendable arms provides interpupillary distance, convergence angle and view adjustment of the ocular devices, which are rotatable attached to the support. An adjustable hinge/slide mount assembly is rotatably attached to the ocular support assembly and provides height and view angle adjustment of the ocular devices. When the slidable arms of the ocular support assembly are extended, however, some rotating motion may occur, in particular with heavier oculars and with fully extended support arms. The rotating motion causes vertical misalignment, or divergence, of the axes of the ocular devices. Excessive divergence can cause eyestrain, discomfort and even headaches.

U.S. Pat. No. 6,333,814 improves upon the above design by providing a pair of stabilizers disposed inside the assembly housing and providing stability against rotational motion when the arms are extended. In one embodiment, the stabilizers are interference-fitted balls, retained in position by retainer holes in the assembly housing, and receding into recess cut-outs at the end of the support arms when the arms are fully retracted. In an alternate embodiment, the stabilizers are L-shaped, and can be either an integral part of the housing or bonded to it with adhesive.

Despite these advances, existing designs tend to be physically rather bulky, limiting peripheral vision, for example, when the practitioner looks away from the loupes. FIG. 1 is a drawing that shows front and top views of an older rack assembly, including a housing 20 into which support arms 22 are slidingly engaged to set interpupillary distance using adjusting knob 24. The oculars 14 are attached to the arms 22 through pivots 32 which may be adjustable or fixed in position for a given working distance. A rearward extension 34 having side pins interconnects to a pivot assembly (not shown) which, in turn, may be affixed to eyeglass frames or a headband mount. These features are shown in the issued patents referenced hereinabove. Note that in this older design, the front of the housing 20 is a considerable distance d1 from the front of the oculars, and the height of the side arms 22, h1, is nearly equal to the top of the housing 20, resulting in portions having a relatively large cross-section directly above the eyes of the user. As such, when the user looks away from the oculars 14, these extensions of the support arms tend to get in the way.

FIG. 2 shows a somewhat newer design, wherein the pivot points 32' are pushed back on the oculars, allowing the distance d2 to be shortened significantly. However, in this case, the cross-sections 22' of the outwardly extending support arms are nearly the same height as the housing 20', leading to continual visual obscuration.

SUMMARY OF THE INVENTION

This invention improves upon prior-art ocular support assemblies by removing material present in the forward-looking cross-section of the outwardly extending support arms, thereby reducing visual obscuration and enhancing peripheral vision. In the preferred embodiment, the top of the outwardly extending support arm is approximate to the middle of the height of the housing, thereby resulting in a low-profile design. At the same time, the support arms are received by the housing with sliding engagement on all sides, thereby eliminating the need for ball bearings or spacers to counteract twisting. The result is a lightweight yet highly stable ocular mounting assembly.

DETAILED DESCRIPTION OF THE INVENTION

Figure 1:
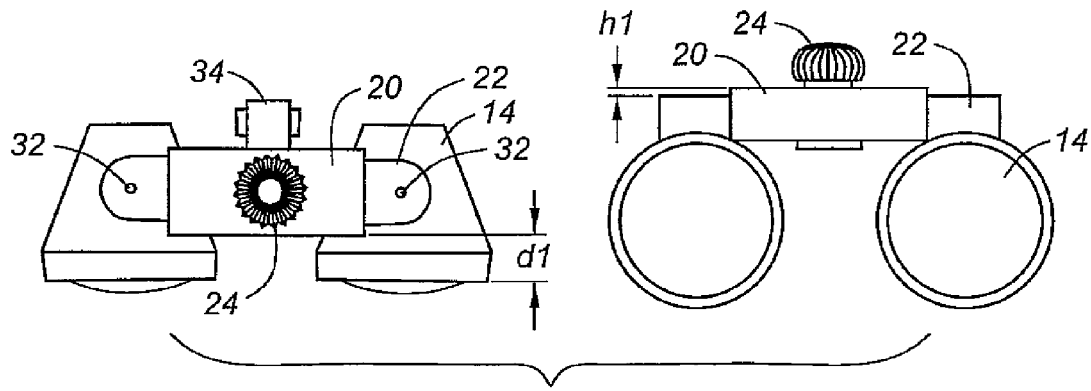
FIG. 1 is a drawing of an older style ocular mounting assembly.
Figure 2:
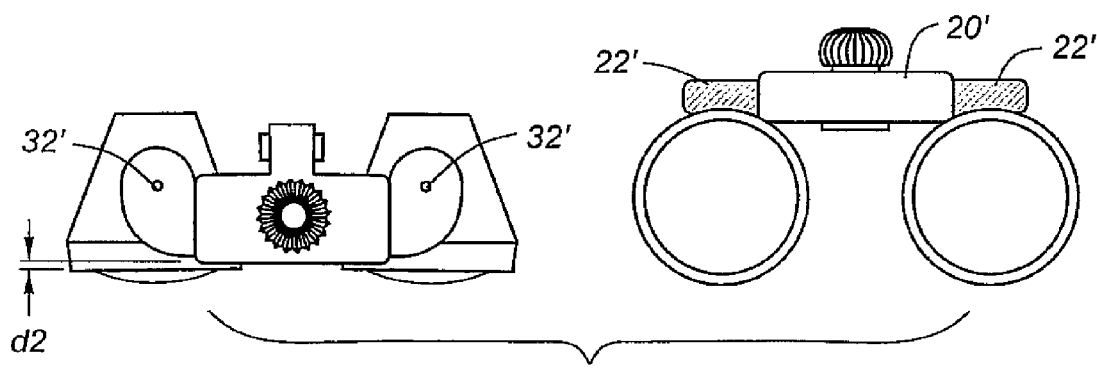
FIG. 2 is a drawing of a relatively new ocular mounting assembly.
Figure 3:
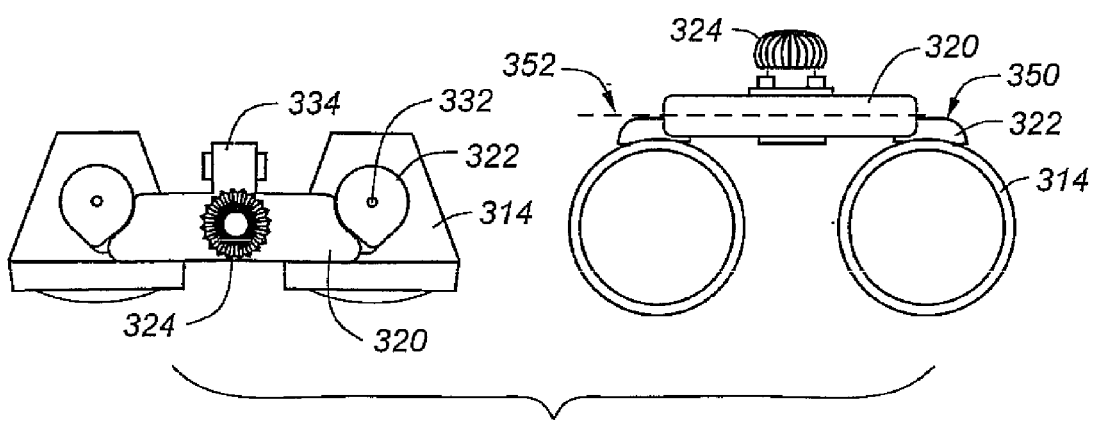
FIG. 3 is a drawing of a mounting assembly configured in accordance with the present invention.

Having discussed FIGS. 1 and 2, the reader's attention is directed to FIG. 3, which shows an ocular mounting assembly constructed in accordance with the invention. The housing is shown at 320, including an outwardly extending portion 334 having side pins that engage with a hinged pivot assembly (not shown), which may be similar to, if not identical to, prior-art hinge assemblies facilitating an eyeglass or headband mount. The adjustment knob is shown at 324, and the oculars are shown at 314.

Importantly, according to the invention, the top surface 350 of each support arm 322 has material removed, allowing the top of the support arm to be at or below the horizontal centerline 352 of the housing 320. This removed material decreases visual obscuration and enhances peripheral vision for the user. In the preferred embodiment, the dimension between the top of the arms major length to the area directly above the ocular is 0.099"+/−0.010" (2.51+/−0.25 mm). The dimension from the top of the rack housing to the area directly above the ocular is 0.149"+/−0.015" (3.78+/−0.38 mm).

Figure 4A:
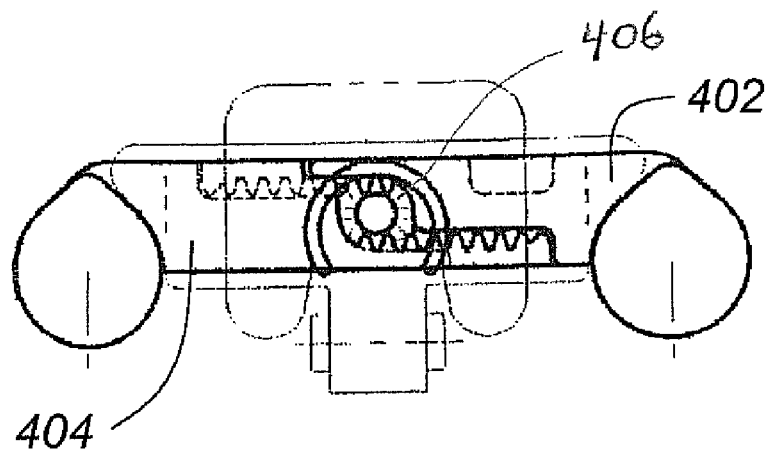
FIG. 4A is a top-view drawing of the ocular mounting assembly of FIG. 3 with the support arms retracted, showing the way in which gear meshing occurs.
Figure 4B:
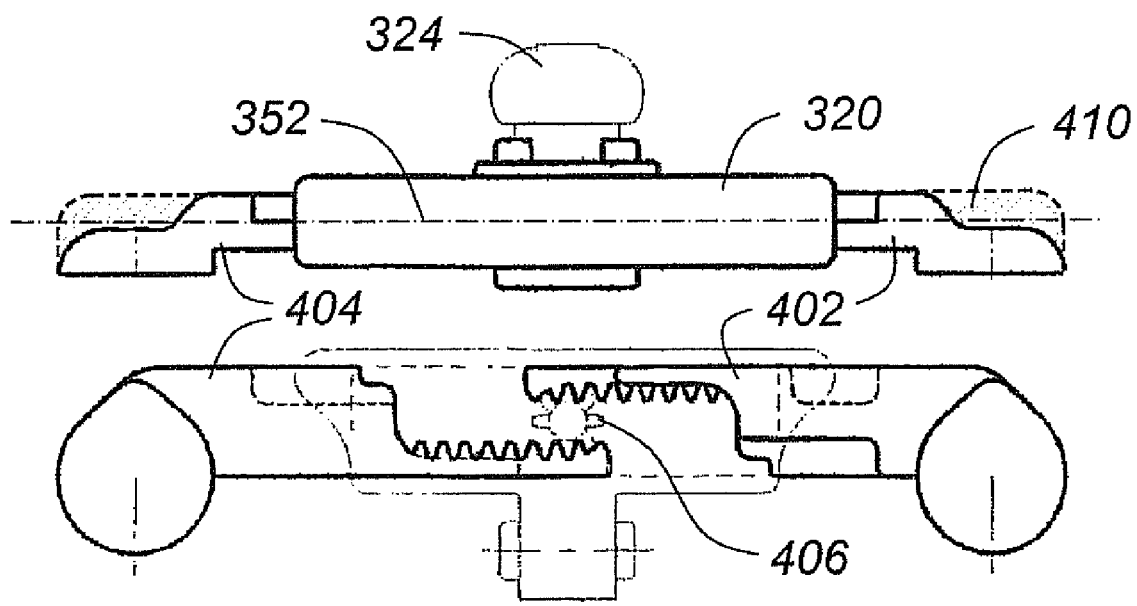
FIG. 4B is a top-view drawing of the ocular mounting assembly of FIG. 3 with the support arms extended.

FIG. 4A is a top-view drawing illustrating the inner workings of the invention, with support arms 322 each having narrower portions 402, 404 including teeth with mesh gear 406. FIG. 4B is a top-view drawing of the ocular mounting assembly of FIG. 3 with the support arms extended. The gear 406 is, in turn, coupled to the adjustment valve 324 to facilitate interpupillary distance adjustment. Another important aspect of the invention, however, is that the portions of the support arms between the ocular mounting pads and the portions 402, 404 with teeth are substantially rectangular, such that all four side surfaces of the support arms are slidingly engaged by the rectangular openings of the housing 320, thereby preventing twisting. Although portions 410 are relieved to reduce weight, the anti-twisting design is not defeated.

Note that the oculars may be independently rotatable about axes 332, or they may be fixed at a particular convergence angle as disclosed in commonly assigned U.S. Pat. No. 6,704,141. The divergence adjustments of U.S. Pat. No. 6,439,714 may also be employed.

We claim:

1. An ocular mounting assembly, comprising:
    - a housing having a front surface, a back surface and opposing open ends, each with an inner wall;
    - the housing further defining a central, horizontal plane that runs from one open end to the other and divides the housing into an upper half and a lower half;
    - a pair of support arms, each slidingly received by a respective one of the open ends;
    - each support arm terminating in an outer portion extending from the housing;
    - each outer portion having an uppermost surface and a bottom surface adapted for coupling to an ocular loupe; and
    - wherein the uppermost surface of the outer portion of each support arm is at or below the horizontal plane.

2. The ocular mounting assembly of claim 1, wherein each support arm includes a central portion with an outer surface that is substantially flush with the inner wall of the housing to minimize twisting.

3. The ocular mounting assembly of claim 1, wherein each support arm includes an inner portion disposed entirely within the housing, each inner portion including a plurality of teeth that engage with a central gear coupled to an external knob to adjust for interpupillary distance.

4. The ocular mounting assembly of claim 1, wherein the back surface of the housing includes an extension adapted for pivotal coupling to a spectacle or headband mount.

* * * * *